United States Patent
Georgelos et al.

(10) Patent No.: US 6,749,910 B1
(45) Date of Patent: Jun. 15, 2004

(54) BAG FOR BONE-IN MEAT PACKING

(75) Inventors: Paul Nick Georgelos, Naperville, IL (US); Paul David Tatarka, Woodridge, IL (US)

(73) Assignee: Curwood, Inc., Oshkosh, WI (US)

( * ) Notice: Subject to any disclaimer, the term of this patent is extended or adjusted under 35 U.S.C. 154(b) by 0 days.

(21) Appl. No.: 09/110,455

(22) Filed: Jul. 7, 1998

(51) Int. Cl.$^7$ ................................................ B32B 27/32
(52) U.S. Cl. ..................... 428/34.9; 428/35.7; 428/349; 428/523; 426/106; 426/129; 525/240
(58) Field of Search ................................ 428/34.9, 34.8, 428/200, 203, 213, 523, 63, 68, 119, 576, 35.7, 910, 500, 349; 525/240; 426/129, 106

(56) References Cited

U.S. PATENT DOCUMENTS

| | | | |
|---|---|---|---|
| 4,755,403 A | 7/1988 | Ferguson | 428/35 |
| 5,302,402 A | 4/1994 | Dudenhoeffer et al. | 426/129 |
| 5,403,668 A | 4/1995 | Wilhoit | 428/500 |
| 5,545,419 A | 8/1996 | Brady et al. | 426/129 |
| 5,562,958 A * | 10/1996 | Walton et al. | 428/34.9 |
| 5,707,751 A | 1/1998 | Garza et al. | 428/515 |
| 5,928,740 A * | 7/1999 | Wilhoit et al. | 428/34.9 |
| 6,004,599 A * | 12/1999 | Bert et al. | 426/129 |

FOREIGN PATENT DOCUMENTS

| | | | |
|---|---|---|---|
| GB | 2 296 005 A | | 6/1996 |
| GB | 238930 A | * | 10/1999 |
| GB | 2339186 A | * | 1/2000 |

* cited by examiner

*Primary Examiner*—Harold Pyon
*Assistant Examiner*—Sow-Fun Hon
(74) *Attorney, Agent, or Firm*—Roger Aceto; Cedric M. Richeson

(57) ABSTRACT

A patch bag for, packaging bone-in meat cuts having a thin-walled heat shrinkable monolayer patch film adhered to a thin-walled heat shrinkable multilayer bag film wherein the adherence of one to the other is solely due to the surface energy of the films, the patch film and the heat seal layer of the bag film both including blend of a first polyethylene having a density below 0.900 g/cc and a second polyethylene having a density of 0.900 to 0.915 g/cc and a melting point of 90 to 110° C. and a third polyethylene having a density of 0.900 to 0.915 and a melting point of 115 to 130° C. with EVA being a third component of the bag film heat seal layer and an optional component of the patch film.

4 Claims, 1 Drawing Sheet

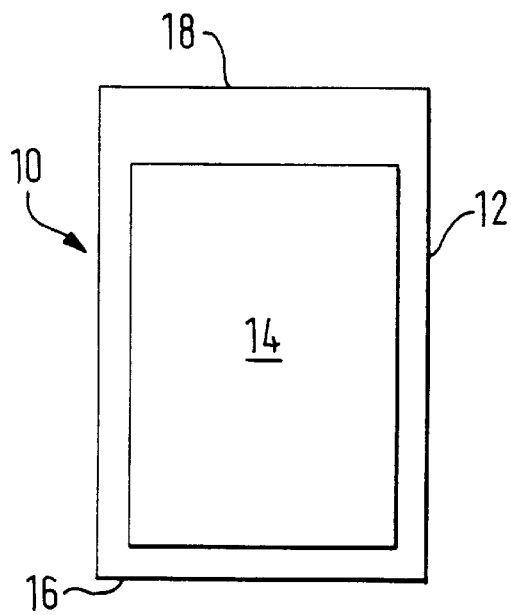
FIG. 1
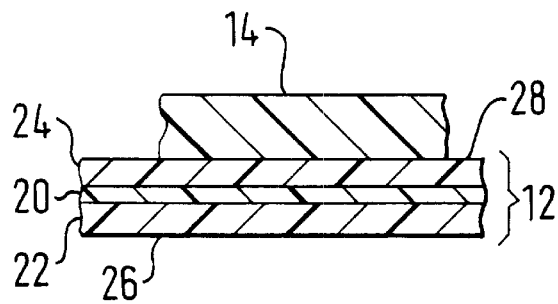
FIG. 2
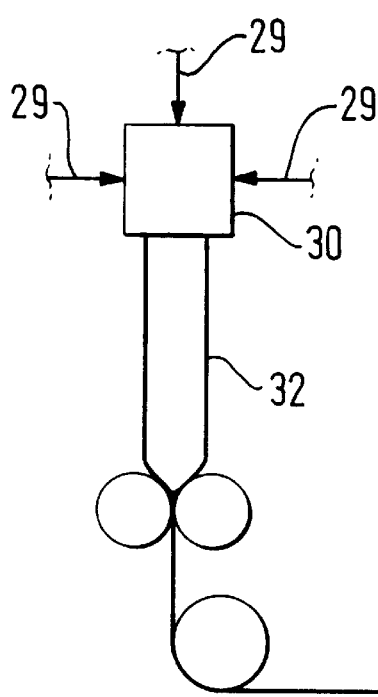
FIG. 3
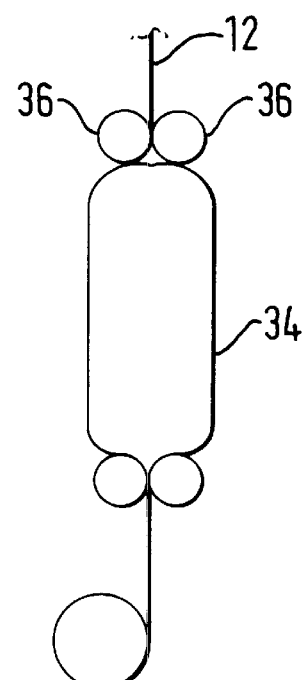

BAG FOR BONE-IN MEAT PACKING

FIELD OF THE INVENTION

The present invention relates to bags for packaging meat and, in particular, to heat-shrinkable bags having a protective patch for packaging bone-in primal cuts of meat.

BACKGROUND OF THE INVENTION

The use of bags formed of heat-shrinkable thermoplastic film for packaging primal cuts of meat is well known in the art. In use, the primal cut is loaded into the bag. The bag is evacuated and heat sealed to form a closed package. Next the package is exposed to warm water or other heating means to cause the bag to shrink and form fit the primal cut.

The bag film is relatively thin and usually not more than about 4 mils (0.10 mm) and generally less than 3 mils (0.076 mm) thick. This thin a bag generally is not satisfactory for packaging cuts of meat which contain bone. For example, the ribs or other sharp bone protrusions as contained by primal and subprimal rib beef cuts or pork ribs, may puncture the bag during the evacuation of air from the bag or during heat shrinking as the bag draws tightly about the bone-in meat cut. A puncture in the bag is undesirable as it allows the meat in the area of the puncture to be exposed to oxygen which shortens shelf life of the packaged product. The problem of bone punctures further is compounded by abrasion between adjacent packages caused by vibration and movement of the meat packages one against another during transport and handling.

A common solution to the problem is to improve the puncture and abrasion resistance of the bag film by adhering a patch to the outer surface of the heat-shrinkable bag. U.S. Pat. No. 4,755,403 discloses use of an oriented, heat-shrinkable multilayer patch which is affixed by adhesive to one surface of an oriented multilayer heat-shrinkable bag. U.S. Pat. No. 5,545,419 discloses adhering two patches to the bag, one to each outer surface of the flattened bag. The shrink properties of the patch in each case are matched to the shrink properties of the bag to reduce the likelihood of delamination of the patch from the bag during heat shrinking.

The shrink properties of the film from which the patch and bag are made derive from the process of orienting the patch (or bag) film. Orientation to provide heat-shrinkability at temperatures below 100° C. and preferably about 90° C. or less is well known in the art. Orientation also is known to improve the puncture resistance of the film. Briefly, orientation is provided by extruding a relatively thick walled tube. The tube is first cooled then reheated to soften it so that it can be expanded by inflation. Inflation provides transverse orientation. Orientation in the machine direction is provided by drawing the tube forward as it is expanded. The tube is formed into bags by heat sealing across the tube or the tube is slit lengthwise and cut to form individual biaxially oriented patches.

While orientation contributes to the puncture resistance of the film, abrasion resistance is a function of film thickness and patches on the order of 4 to 8 mils (0.10 to 0.20 mm) are commonly found on bags which have a wall thickness of 3 mils (0.076 mils) or less.

While a relatively thick patch film is desirable for abrasion resistance, it is known that thick films are more difficult to orient than thin films. In general, as film thickness increases above about 3 mils (0.076 mm) it becomes more difficult to orient so those properties, such as improved puncture resistance which benefit from orientation, begin to decrease. Thus, the desirable properties for a patch film of abrasion and puncture resistance represent a compromise. The compromise is to provide a film thin enough to benefit from the orientation process by having enhanced puncture resistance, yet thick enough to provide enhanced abrasion resistance.

In order to optimize the benefits of puncture resistance through orientation and abrasion resistance by increasing film thickness, multilayer patch materials are used in the prior art. U.S. Pat. Nos. 4,755,403 and 5,545,419 disclose a heat-shrinkable irradiated patch material formed by collapsing an oriented multilayer tube. The tube wall has an inner surface formed of a self-adhering layer of ethylene vinyl acetate (EVA) and an outer surface formed of a polyethylene-EVA blend, the polyethylene being linear low density polyethylene (LLDPE) such as DOWLEX 2045 from the Dow Chemical Company. When the oriented tube is collapsed, the inner surfaces of the tube adhere together and in effect form a three layer patch having the general structure EVA+LLDPE/EVA/EVA+LLDPE. The irradiation dosage is about 7 MR. In a commercial version the irradiated patch is about 5 mils (0.127 mm) thick and is adhered to a multilayer bag having a wall thickness of about 2.3 mils (0.058 mm). Accordingly, in this commercial version the multilayer patch is over twice the thickness of the bag film.

U.S. Pat. No. 5,302,402 discloses a monolayer patch formed of a blown film. The film is not oriented so it is not heat shrinkable. The patch film is composed of a blend of EVA and very low density polyethylene (VLDPE) such as a Dow type XU 61520.01 which has a density of about 0.912 g/cc. As disclosed in this patent, the nonoriented patch of about 5 mils (0.127 mm) to 7 mils (0.178 mm) is applied to the surface of a three layered bag having a wall thickness as thin as 2.25 mils (0.057 mm). The outer surface of the bag is composed of a polymer blend including EVA and the sole bonding means between the nonshrinkable patch and the shrinkable bag is a high surface energy of at least 38 dynes/cm wetting tension. The high surface energy is provided by corona treatment. Prior to heat shrinking, the high surface energy allows the patch to cling to the bag in that it is still possible to peel the patch from the bag. After heat shrinking, however, it was found that the bond between the nonshrunk patch and the shrunk bag increased such that a bond was created sufficient to prevent delamination of the patch from the bag. The abrasion resistance of the bag as measured by simulated and actual shipping tests was comparable to commercial bags having heat-shrinkable patches. Thus, the bag as described in the '402 Patent provided abrasion resistance using a relatively thick 5 to 7 mil (0.127 to 0.178 mm) nonoriented monolayer patch and was said to eliminate the need to biaxially orient and irradiate the patch film.

Since the patch was not oriented, it could be made thicker to improve abrasion resistance. Thus, while the bag as disclosed in the '402 Patent exhibited certain advantages, the lack of orientation of the patch film compromises puncture resistance and the patch generally was thicker than an oriented patch.

Accordingly, an object of the present invention is to provide an improved patch bag for packaging bone-in primal and subprimal cuts of meat.

Another object is an improved patch bag having abrasion resistance and enhanced puncture resistance.

A further object is an improved patch bag which provides abrasion resistance and has enhanced puncture resistance while utilizing a relatively thin patch.

Yet another object is an improved patch bag wherein abrasion resistance and enhanced puncture resistance are achieved using a relatively thin monolayer patch.

SUMMARY OF THE INVENTION

In one aspect, the present invention relates to a patch bag for packaging bone-in meat cuts and especially bone-in primal and subprimal meat cuts such as beef ribs or pork loins and the like. The patch bag comprises a relatively thin walled bag formed of a biaxially oriented multilayered thermoplastic film and a relatively thin patch adhered to an outer surface of the bag, the patch being formed of a biaxially oriented monolayer film.

The bag preferably is formed of a multilayer barrier film wherein an oxygen barrier layer is disposed between a heat-sealable layer which defines the inner surface of the bag, and an abuse layer which defines the outer surface of the bag.

The film comprising the bag structure is biaxially oriented and has a total thickness of between 2.25 mils (0.057 mm) and 3.5 mils (0.089 mm). The patch adhered to the outer surface of the bag is a monolayer biaxially oriented film substantially less than 5 mils (0.127 mm) thick and preferably no more than about 3.5 mils (0.089 mm). Accordingly, the bag film and patch film are about equal in thickness so a feature of the present invention is that the patch is relatively thin and not substantially thicker than the thickness of the bag. Further, the patch according to the present invention provides abrasion resistance and enhanced puncture resistance together with the economy of reducing the patch thickness by 40% or more of the thickness of conventional patches.

The patch bag of the present invention may be formed by laminating the patch to the bag film with a suitable adhesive. However, in a preferred aspect, the invention is characterized by the oriented patch being adhered to the outer surface of the oriented bag film without adhesive. In this respect, one surface of the patch and an outer bag surface are both corona treated to raise the surface energy such that the patch will cling to the bag. This cling is sufficient to maintain the patch in position through the packaging process. Thereafter, upon heat shrinking a still greater adhesion occurs between the oriented patch and bag to the extent that delamination of the patch from the bag during handling and transport of the packaged meat does not occur. The adhesion of an unoriented patch to the bag using corona treatment to cause the adhesion is known from U.S. Pat. No. 5,302,402. However, accomplishing the adhesion using an oriented patch was unexpected in that it was not known whether corona treatment of an oriented film surface would have the desired effect. Not only was the adhesion unexpected, the adherence of the oriented patch according to the present invention proved to be even greater than that of the prior art unoriented patch. Further, adhesion was accomplished even without the surface roughness which was found to be essential for adhering an unoriented patch to an oriented film. Surface roughness can result from melt fracture during extrusion of the film. In the case of an unoriented blown film patch, it was found that films which exhibited little or no melt fracture exhibited poor adherence after corona discharge. In the case of the oriented patch according to the present invention, the absence of melt fracture is no deterrent to adhesion. This means a clear patch film can be made since melt fracture detracts from film clarity.

In one embodiment, the present invention is characterized by the formulation of the monolayer patch being a blend of primarily four components including an EVA and three different ethylene a-olefin copolymers. A first of the ethylene α-olefin copolymers preferably has a melting point of between 55 to 90° C., the second has a melting point of between 90 to 110° C. and the third has a melting point of between 115 to 130° C. These same four components make up the heat seal layer of the bag film. Accordingly, in one embodiment of the patch bag of the present invention, the heat seal layer of the bag film and the patch film are substantially the same formulation.

In an alternative and preferred embodiment, the bag film is the same but the EVA is omitted from the patch film.

DESCRIPTION OF THE DRAWINGS

FIG. 1 illustrates a patch bag according to the present invention;

FIG. 2 is a cross sectional view of a portion of the patch bag wall; and

FIG. 3 is a schematic view illustrating steps of the film orientation process.

DETAILED DESCRIPTION OF THE INVENTION

Referring to the drawings, FIG. 1 shows the patch bag of the present invention generally indicated at 10. The patch bag comprises a bag portion 12 and a patch 14 adhered to an outer surface of the bag. The bag preferably is formed by collapsing a tubular film to its flat width and then heat sealing across the flat width to form the closed bottom 16 of the bag. The top 18 is opened.

The patch 14 generally is smaller in area than the bag as shown but it also can have a width equal to or greater than the bag width so that a maximum surface area of the bag is covered. While the patch is shown applied to only one side of the bag, patches can be applied to both 0 sides as shown, for example, in U.S. Pat. No. 5,545,419.

Both the bag portion and patch are formed of a biaxially oriented heat-shrinkable thermoplastic film. The bag film is a multilayer film and the patch film is a monolayer film.

As used herein, "biaxially oriented" and "heat-shrinkable" mean that the bag and patch films each have an unrestrained shrinkage of at least 10% in each of the transverse direction (TD) and machine direction (MD) measured at 90° C. (194° F.). Preferably they have an unrestrained shrinkage of at least 20% in each direction and most preferably the shrink is at least 40% or more in both directions.

Measuring the unrestrained shrink value of a thermoplastic film is accomplished by a procedure derived from ASTM D2732. In this procedure, four test specimens are cut from a given sample of the film to be tested. The specimens are cut to 10cm in the machine direction by 10cm in the transverse direction. Each specimen is completely immersed for 5 seconds in a 90° C. water bath. After removal from the water bath, the distance between the ends of the specimen is measured. The difference in the measured distance for the shrunken specimen and the original 10 cm is multiplied by ten to obtain the percent of shrinkage for the specimen. The shrinkage for the four specimens is averaged for the MD shrinkage values of the given film sample, and the shrinkage for the four specimens is averaged for the TD shrinkage value.

As shown in FIG. 2, the film which forms the bag portion 12 preferably is a multilayer film including a barrier layer 20 disposed between an inner heat sealing layer 22 and an outer abuse layer 24. The inner layer 22 defines the inner surface 26 of the bag and abuse layer 24 defines the outer surface 28 of the bag. The patch 14 as shown in FIG. 2 is a monolayer film adhered to the bag outer surface 28.

The terms "barrier" or "barrier layer" as used herein means a layer of a multilayer film which acts as a physical barrier to gaseous oxygen molecules. Physically, a barrier layer material will reduce the oxygen permeability of a film (used to form the bag) to less than 70 cc per square meter in 24 hours at one atmosphere at a temperature of 73° F. (23° C.) and 0% relative humidity. These values should be measured in accordance with ASTM standard D-1434.

Barrier layer 20 is formed of any suitable oxygen barrier material or blend of material, for example, ethylene-vinyl alcohol copolymer (EVOH) or vinylidene chloride copolymers (VDC) such as VDC-vinyl chloride (VDC-VC) or VDC-methylacrylate (VDC-MA). For purposes of the present invention, a preferred barrier layer comprises a blend of VDC-VC and VDC-MA and, in particular, a blend of 85 wt. % VDC-MA and 15 wt. % VDC-VC.

As noted above, the bag film 12 is generally 2.25 to 3.5 mils (0.057 to 0.089 mm) and preferably no more than 3 mils thick. In this structure, the abuse layer 24 would be 0.68 to 0.9 mils (0.017 to 0.0228 mm) thick, the barrier layer 20 would be 0.225 to 0.3 mils (0.006 to 0.008 mm) thick and the seal layer 22 would be 1.35 to 1.8 mils (0.034 to 0.046 mm) thick.

In one embodiment of the present invention, substantially the same blend of polymers form both the heat seal layer 22 of the multilayer bag film 12 and the patch film 14. In this embodiment, the heat seal layer and the patch film is a four polymer blend.

The first ethylene alpha olefin polymer of the blend has a melting point between 55 to 90° C., and comprises an ethylene alpha olefin copolymer. Examples of suitable first polymers include copolymers of ethylene with at least one $C_3$–$C_{10}$ alpha-olefin, such as $C_2/C_4$ and $C_2/C_6$, $C_2/C_8$ copolymers e.g., ethylene butene-1 copolymer, ethylene hexene-1 copolymer and ethylene octene-1 copolymer. Exemplary suitable first polymers may have a density of 0.900 g/cm³ or less, a melt index of about 1.5 dg/min. or less, and an $\overline{M}_w/\overline{M}_n$ of less than 3, preferably about 2. Preferred commercially available first copolymers include those sold under the trademark TAFMER A-0585 and EXACT 9036. TAFMER is a trademark of Mitsui Petrochemical Co., Tokyo, Japan. EXACT is a trademark of EXXON Chemical Co., Houston, Tex., U.S.A. for their ethylene alpha-olefin polymers produced using metallocene single-site catalysts. These resins typically have a low level of crystallinity, 10 to 15% is typical. It is preferred that the first polymer of the heat sealing layer comprise a copolymer of ethylene having a melt index (M.I.) between about 0.2 and 2 (more preferably 0.2 to 0.7) dg/min. as measured by ASTM D-1238, at 190° C. under a total load of 2.16 Kg (condition E). Polymers of the type suitable for use as the first polymer and having the properties as described are sometimes referred to herein as "Plastomers". The term mPlastomers as used herein refers specifically to a Plastomer made using a metallocene catalyst system.

The second ethylene alpha olefin polymer of the blend has a melting point of from 90 to 100° C., and comprises a copolymer of ethylene and at least one alpha olefin. Examples of suitable second copolymers include copolymers of ethylene and at least one $C_3$ to $C_{10}$ alpha olefin, such as $C_2/C_4$, $C_2/C_6$, $C_2/C_8$ and $C_2/C_4/C_6$ copolymers, e.g., ethylene butene-1 copolymer, ethylene hexene-1 copolymer, ethylene octene-1 copolymer, and ethylene butene-1 hexene-1 copolymer. The latter copolymer is an example of a suitable terpolymer. Exemplary suitable second polymers may have a density of at least about 0.900 g/cm³ and higher, preferably from 0.900 to 0.915 g/cm³; a melt index preferably of 2 dg/min. or less, more preferably about 0.8–1.2 dg/min.; and a $\overline{M}_w/\overline{M}_n$ of preferably less than 3.5. In one embodiment of the invention a preferred second polymer has a $\overline{M}_w/\overline{M}_n$ of about 2. Preferred second copolymers include AFFINITY PL 1840, AFFINITY PL 1880, and EXACT 3032. AFFINITY is a trademark of Dow Chemical Co. of Midland, Mich., U.S.A. for its ethylene polymers produced using metallocene constrained geometry catalysts. EXACT is a trademark of Exxon Chemical Co. of Houston, Tex., U.S.A. for their metallocene single site catalyst produced polymers. It is preferred that the second polymer of the abuse layer comprise a copolymer of ethylene having a melt index (M.I.) between about 0.5 and 2.5 (more preferably 0.7 to 1.5) dg/min. as measured by ASTM D-1238, at 190° C. under a total load of 2.16 Kg (condition E).

The third polymer of the blend has a melting point of from 115 to 130° C. and comprises a thermoplastic polymer, preferably a copolymer of ethylene and at least one alpha olefin. Examples of suitable third polymers include copolymers of ethylene and at least one $C_3$ to $C_{10}$ alpha olefin, such as $C_2/C_4$, $C_2/C_6$, $C_2/C_8$ and $C_2/C_4/C_6$ copolymers, e.g. ethylene butene-1 copolymer, ethylene hexene-1 copolymer. Exemplary suitable third polymers may have a density of at least about 0.900 g/cm³ and higher, preferably from 0.900 to 0.915 g/cm³; a melt index of 2 dg/min. or less, preferably 1.0 dg/min. or less; and a $\overline{M}_w/\overline{M}_n$ of from about 2 to 12 or more, preferably greater than 3.5. Preferred third copolymers include ATTANE XU 61509.32. ATTANE is a trademark of Dow Chemical Co. of Midland, Mich., USA. It is preferred that the third polymer of the heal sealing layer comprise a polymer of ethylene having a melt index (M.I.) between about 0.2 and 2 (more preferably 0.2 to 0.7) dg/min. as measured by ASTM D-1238, at 190° C. under a total load of 2.16 Kg (condition E).

The second and third polymers are sometimes each referred to herein as a very low density polyethylene or VLDPE wherein the second polymer, to distinguish it as being a constrained geometry catalyzed or metallocene catalyzed polymer is referred to herein as mVLDPE.

The fourth polymer of the heat seal layer blend, and which is optional in the patch has a melting point of from 80 to 105° C., preferably 90 to 100° C. Suitable fourth polymers that may be employed include copolymers of ethylene and unsaturated esters having adhesive and/or heat sealing properties. Such copolymers are predominantly (>50 wt. %) ethylene. Suitable copolymers include ethylene vinyl esters and ethylene alkyl acrylates such as ethylene-vinyl acetate, ethylene-vinyl propionate, ethylene-methyl methacrylate, ethylene-ethyl methacrylate, ethylene-ethyl acrylate, and ethylene n-butyl acrylate. Preferred copolymers are ethylene-vinyl esters such as ethylene-vinyl acetate, ethylene-vinyl formate, ethylene-vinyl propionate, and ethylene-vinyl butylate. Especially preferred is ethylene-vinyl acetate copolymer (EVA). Many different EVA resins are commercially available having a wide range of vinyl acetate contents and melt flow indices.

Suitable vinyl ester or alkyl acrylate content of the preferred fourth polymer components used in the present invention include 4 to 28 (preferably 4 to 18) wt. % vinyl ester or alkyl acrylate based on the total third polymer weight.

For the embodiment of the present invention where the film heat seal layer and the patch film have the same formulation, it is preferred that the fourth polymer of the abuse layer and patch comprise a copolymer of ethylene and a vinyl ester having a melt index (M.I.) between about 0.1 and 2 (more preferably 0.1 to 0.5) dg/min. as measured by ASTM D-1238, at 190° C. under a total load of 2.16 Kg (condition E).

A most preferred EVA copolymer is that sold by the Exxon Chemical Company of Houston, Tex. under the brand designation ESCORENE LD 701.06 with the following reported properties, a density of 0.93 g/cm$^3$, a vinyl acetate content of 10.5 wt. %, and a melt index of about 0.19 dg/min., and a melting point of about 97° C.

In this first embodiment, the blend of polymers for the heat seal layer of the bag film and for the monolayer patch, which are substantially the same blend, will comprise about 20 to 30 wt % of the first polymer (Plastomer), from about 30 to 40 wt % of the second polymer (mVLDPE), from about 15 to 25 wt % of the third polymer (VLDPE) and 15 to 25 wt % of the fourth polymer (EVA). A preferred blend of polymers for the heat seal layer of the bag film includes a conventional slip aid and a stabilizer whereas the blend for the monolayer patch comprises substantially the same components but without the stabilizer. Thus, in one embodiment of the present invention, the monolayer patch film although thicker than the bag film heat seal layer 22, comprises substantially the same four component polymer blend of Plastomer, mVLDPE, VLDPE and EVA as the heat seal layer of the bag film.

The abuse layer of the bag film is generally a three component blend similar to the heat seal layer only omitting the third polymer (VLDPE). A suitable blend for the abuse layer is 20 to 30 wt % of the first polymer (Plastomer), 40 to 50 wt % of the second polymer (mVLDPE) and 20 to 30 wt % of the fourth polymer(EVA).

In other embodiments of the invention the bag film will be substantially the same as set out above but the patch film will omit the fourth polymer (EVA). In this respect a second embodiment to the patch film will be substantially a three component blend of 20 to 60 wt. % of the first polymer (Plastomer), 20 to 60 wt. % of the second polymer (mVLDPE) and 15 to 25 wt. % of the third polymer (VLDPE) together with a minor amount of a processing aid to reduce melt fracture.

For example a preferred patch film formulation of the second embodiment comprises:

26 wt % of the first polymer (Plastomer), 50 wt % of the second polymer (mVLDPE)

21 wt % of the third polymer (VLDPE) and 4 wt % of a processing aid.

A preferred first polymer for this embodiment is a $C_2/C_6$ copolymer such as an EXACT 9092 hexene mPlastomer which has a density of 0.895 g/cm$^3$, a melt index of 0.8 dg/min and a melting temperature of 85.2° C. A preferred second polymer (mVLDPE) is the Dow AFFINITY PL1 880 and a preferred third polymer (VLDPE) is the Dow ATTANE XU 61509.32.

If melt fracture is not an issue, the processing aid may be omitted. In this case a suitable blend is generally the following formula:

50 wt % second polymer—Dow AFFINITY PL 1880

30 wt % first polymer—Exxon EXACT 9092 and 20 wt % third polymer—Dow ATTANE XU 61509.32.

It should be noted that the above reported melt indices for the various resins employed as the first, second, third and fourth polymers are initial melt index values for the pelletized resins as received by the manufacturer. Such "as received" pellet values are intended when the term melt index is used herein unless otherwise noted. Crosslinking, especially irradiative crosslinking, is known to increase the average molecular weight by formation of longer chains of molecules than originally present. Therefore, crosslinking will also reduce the melt index of a polymer from its initial value to a lower value since the melt index is not only a measure of viscosity but also an indirect measure of molecular weight. Also, the melt blended material will also have its own melt index which is not to be confused with that of the original copolymer components of the blend. The industry custom is that the term "melt index" refers to the resin (usually pelletized or powdered) as received from the polymer manufacturer unless otherwise specified. Also, when an interpolymer is used, the interpolymer resin may have two or more melting points which satisfy the different melting points required by the present invention.

Both the film of the bag portion 12 and film of the patch 14 are made using a conventional double bubble process to form biaxially oriented heat-shrinkable films as disclosed, for example, in Pahlke U.S. Pat. No. 3,456,044. Briefly, in the double bubble (sometimes called a trapped bubble process) as shown in FIG. 3, the polymers are extruded from an annular die 30 as a relatively thick walled tube 32. In the case of the bag film the polymer blends making up the several layers are coextruded by conveying separate melt streams 29 to the die. These melt streams are combined in the die and extruded as a multilayer structure. In any event, the thick walled tube 32 or "primary" leaving the extrusion die is cooled and collapsed. It then is reheated to below its melting point and inflated with air to form the secondary bubble 34. The inflation which diametrically expands the film provides transverse or TD orientation. Orientation in the machine direction (MD) is accomplished by adjusting the speed of nip rollers 36 to pull or draw the film in the machine direction.

In the case of the multilayer bag film, the biaxial orientation preferably is sufficient to provide a multilayer film with a total thickness of between 2.25 and 3.5 mils (0.064 to 0.089 mm). The MD stretch ratio typically is 3 to 5 and the TD stretch ratio typically also is 3 to 5.

For the monolayer patch film, the biaxial orientation is sufficient to provide a monolayer film having a total thickness of between 2.5 and 3.5 mils (0.064 to 0.089 mm) and is generally in the same stretch ratio range as the bag film, namely about 3 to 5 for both the MD and TD.

After orientation, the tubular patch film is slit longitudinally and laid flat. The bag film is collapsed to its flat width without slitting. One flattened surface of the bag film (the patch receiving surface 28) and one surface of the patch film is each separately exposed to high energy to increase the surface tension of these films. This, for example, preferably is accomplished by corona discharge although other methods may be used such as flame, plasma or ultraviolet treatment among others. The treatment should increase the surface tension of each treated surface, as measured by wetting tension, to at least about 38 dynes/cm and preferably to about 44 to 46 dynes/cm. The patch film my have a higher surface tension.

After the surface energy of the bag and patch film has been raised, the patch film is cut into individual patches which are laid at spaced intervals along the flattened bag film. Next, individual bags are made by forming a heat seal across the flattened bag film and then severing the bag film to form the individual bags as shown in FIG. 1. The method and apparatus for applying the patch film and making individual bags form no part of the present invention. A suitable method and apparatus for applying the patch and making bags is described in U.S. Pat. No. 5,302,402, the disclosure of which is incorporated herein by reference.

Several tests were conducted to demonstrate the superior puncture resistance of the patch bags of the present invention.

A multilayer bag film was made and tested. In particular, the bag film was a three layer barrier film. The inner or heat seal layer was formulated of a blend of:

a) 24 wt. % of the first polymer, and specifically Mitsui Petrochemical Industries TAFMER® A0585x which is a $C_2$–$C_4$ copolymer having a density of 0.885 g/cm$^3$, a melt index (MI) of 0.5 dg/min, a melting point (MP) of 68° C., which for purposes of this invention is referred to as Plastomer;

b) 29.1 wt. % of the second polymer and specifically a Dow Chemical Company AFFINITY® PL1880 which is an ethylene-octene copolymer having a density of about 0.902 g/cm$^3$, an MI of about 1.0 dg/min. and an MP of about 100° C. Dow's AFFINITY resins are made using constrained geometry catalysts which, for purposes of this invention, is referred to as metallocene very low density polyethylene (mVLDPE);

c) 19.2 wt % of the third polymer and specifically Dow's ATTANE® XU 61509.32 which is an ethylene-octene copolymer having a density of about 0.912 g/cm$^3$, an MI of about 0.5 dg/min., an MP of about 122° C. and a Vicat Softening Point of 95° C. which, for purposes of the present invention, is referred to as VLDPE.

d) 19.3 wt. % of the fourth polymer and specifically an Exxon Chemical Company LD 701.06 EVA having a vinyl acetate content of 10.5%, a density of 0.93 g/cm$^3$, an MI of 0.19 dg/min. and an MP of about 97° C.

The remainder of the blend comprised 4.4 wt. % of conventional slip processing aids and 4 wt. % of a stabilizer.

The film core or barrier layer was a blend of 85 wt. % vinylidene chloride-methacrylate (VDC-MA) copolymer and 15 wt. % vinylidene chloride-vinyl chloride (VDC-VC) copolymer.

The outer abuse layer of the film was formulated of a blend of:

a) 24.3 wt. % of the first polymer (Plastomer) specifically a Mitsui Tafmer A 0585X;

b) 47 wt. % of the second polymer (mVLDPE) specifically a Dow AFFINITY PL 1880; and c) 24.3 wt. % of the fourth polymer (EVA) specifically an Exxon LD 701.06.

The remainder of the abuse layer blend comprised slip processing aids.

The formulations of the three layers were coextruded through an annular die to form a primary tube.

The tube was cooled, flattened, reheated, inflated to form a bubble to biaxially stretch the tube and the bubble cooled. The MD draw and TD inflation during biaxial orientation were 4.8:1 to 4.9:1 and 4.6:1 to 4.7:1 respectively. The temperature on reheating for orientation is believed to be about 80° C. The resulting film had an average gauge of about 2.5 mils (0.063 mm), wherein the thickness of the heat seal, barrier and abuse layers were 0.75 mils (0.178 mm), 0.25 mils (0.064 mm) and 1.5 mils (0.038 mm) respectively.

The orientation temperature, bubble cooling rates and orientation ratios are generally adjusted as known in the art to maximize bubble stability wherein the use of higher throughput rates and lower bubble temperatures are believed to provide films having higher puncture resistance relative to the use of lower throughput or higher orientation temperatures.

After orientation, the film was irradiated by electron beam according to methods well known in the art to a level of about 5.3 Mrad. This bag film is Sample 1.

A first EVA containing monolayer patch film was made in a similar fashion. The patch film formulation was nearly identical to the formulation of the heat seal layer of the bag film, namely:

35 wt. % mVLDPE (Dow AFFINITY PL 1880)

24 wt. % Plastomer (Mitsui Tafmer A 0585X)

20 wt. % VLDPE (Dow XU 61509.32)

19 wt. % EVA (Exxon LD 701.06)

2 wt. % processing aid.

Extrusion of this formulation was through a 110 mm diameter annular die having an 80 mil (0.192 mm) gap to form a primary which has a diameter of 5.5 inches (13.97 cm) and a wall thickness of 38 mils (0.965 mm). The primary was cooled, flattened, reheated, inflated to biaxially stretch the film and cooled. The MD draw during orientation was 4.5 and the TD inflation during biaxial orientation is 3.5. The temperature on reheating for orientation was believed to be about 80° C. The oriented tubular patch film was slit longitudinally to form a sheet about 17 inches (40.8 cm) in width. The average gauge of the film was about 2.5 mils (0.066 mm) thick. The patch film was not irradiated and is identified as Sample 2a.

A slightly thicker version of the same patch was made at an average gauge of about 3.25 mils (0.0825 mm) and is identified as Sample 2b.

A third patch was extruded and oriented under substantially the same conditions as the four component EVA-containing blends of Samples 2a and 2b. This third patch, identified as Sample 3, is the same blend as the second embodiment being a blend of:

50 wt % second polymer (mVLDPE)—Dow AFFINITY PL 1880

25 wt % first polymer (Plastomer)—Exxon EXACT 9092

21 wt % third polymer (VLDPE)—Dow ATTANE XU 61509.32

4 wt % processing aid.

Samples of the bag film and patch film were tested for shrink in accordance with the test procedure set out above. The shrink of the bag film was 48% MD and 50% TD, the shrink of the four component, EVA-containing monolayer patch film and the shrink of the three component, non EVA-containing patch film were each about 45% to 55% in both the MD and While the patch and bag films can be corona treated to adhere one to the other as described in U.S. Pat. No. 5,302,402, for test purposes, patch bags were prepared by hand laminating the four component EVA-containing patches (Samples 2a and 2b) to the bag using an adhesive so that the samples were comparable to the patch bags as disclosed in U.S. Pat. No. 4,755,403 designated as a First Control. The First Control is described further hereinbelow. Patch bags made in this fashion with patch Samples 2a and 2b are identified as patch bag Samples 4a and 4b respectively.

The bag film and the three component, non EVA-containing patch of Sample 3 were each corona treated and laminated in accordance with the teachings of U.S. Pat. No. 5,302,402. This patch bag, identified as Sample 5 represents a preferred embodiment of the present invention.

The ram puncture resistance of various samples were measured individually prior to heat shrinking. These included:

Sample 1, the oriented bag film;

Sample 2a, an oriented monolayer patch film being a blend of the same four components as the bag film heat seal layer with an average gauge of about 2.5 to 2.6 mils (0.063 to 0.066 mm);

Sample 2b, the same as 2a only having an average gauge of about 3.25 mils (0.0813 mm);

Sample 3, an oriented monolayer patch film being a blend of three components including a hexene mPlastomer without EVA;

Sample 4a, a patch bag made by hand laminating the Sample 2a oriented monolayer patch film to the bag film with an adhesive;

Sample 4b, a patch bag made by hand laminating the Sample 2b oriented monolayer patch film tho the bag film with an adhesive; and Sample 5, a patch bag made by laminating the oriented monolayer patch of Sample 3 to the bag film with corona discharge.

In addition two controls were tested. The First Control identified as Sample 6, is a commercial patch bag sold by W. R. Grace. It is believed the Grace bags identified as TBG are made in accordance with the teaching of U.S. Pat. No. 4,755,403. In this respect, the patch material is an oriented three layer structure formed by collapsing a two layer tubular film so the inner layers adhere. The resulting structure yields a three layer film having an inner EVA layer disposed between layers comprising a blend of very low density polyethylene and EVA. In accordance with the '403 Patent, the patch is irradiated to about 7 MR. The bag film is an oriented multilayer structure believed to be four layers wherein the inner heat seal layer is a polyethylene adhered to a MA-Saran barrier layer by a tie layer which is a blend of polyethylene and acrylate. The outer abuse layer is believed to be a blend of EVA and a high density polyethylene. The bag film has a nominal thickness of about 2.7 mils (0.0686 mm) thick and the patch film is about 4.5 mils (0.1168 mm) thick.

The Second Control (Sample 7) is a patch bag made in accordance with the teachings of U.S. Pat. No. 5,302,402. In this respect a multilayer nonoriented blown film patch of about 0.1778 mm (7 mil) as disclosed in the '402 Patent was applied to a bag film using corona discharge to adhere the film. The bag film was essentially the same three layer film as described above Sample 1. The patch was a monolayer blown film composed of a blend of 25 wt. % EVA and 75 wt. % of a mVLDPE.

The ram puncture resistance of the various samples were tested. The ram puncture test is more specifically described in PCT Serial No. U.S. Ser. No. 98/03914 filed Apr. 17, 1998. Briefly, the ram puncture test is used to determine the maximum puncture load or force, and the maximum puncture stress of a flexible film when struck by a hemispherically shaped striker. This test provides a quantitative measure of the puncture resistance of thin plastic films. Values of this test will differ from those generated by a dynamic puncture test due to differences in striker geometry, loading rate and geometry and available energy. The dynamic puncture test employs a pyramidal striker that simulates a sharp cut bone end as opposed to the hemispherically shaped striker that is used in the ram puncture test; the dynamic puncture test passes through a pendulum arc during puncture, and the available energy is not always sufficient to puncture the film.

In conducting the ram puncture test, an approximately 5 inch (12.7 cm) diameter film sample is obtained and its thickness measured and recorded. This sample is then clamped taut but without stretching across an approximately 3 inch (7.6 cm) diameter circular opening in a fixture. The fixture is positioned so that the plane of the film is held horizontal and perpendicular to the path of a striker located above the film. The striker is a 3.95 mm diameter steel ball welded to a 5 cm long hollow steel shaft. The shaft, is attached to a 50 lb full-scale Dytran™ piezoelectric load cell (available from Dytran Instruments, Inc., U.S.A.) which in turn is affixed to a crosshead assembly that forms a 3.00 kg mass. The crosshead is slidably supported on two vertical hardened steel guide shafts.

In operation, the crosshead is raised and released to propel the striker by gravity toward the clamped film at a velocity $v_0$ which is kinematically related to the drop height. When the striker contacts the film, the film deforms from its horizontal plane and resists the impact force through uniform multidirectional tensile stresses across the thickness of the film. The angle of deflection of the film theta ($\theta$) is the angle defined between the film in the clamped horizontal position and the stretched film at the peak puncture load recorded during impact. This angle is always less than 90°. It is automatically measured and recorded by a data acquisition system associated with the tester. The force output of the load cell attached to the striker is recorded at a frequency of 300 kHz beginning at roughly 1 msec prior to impact and as the striker impacts, penetrates, and punctures the film sample. Assuming that the membrane stresses are in the plane of the film (no bending stresses), and that the measured load depends upon the geometry of the striker, then the maximum stress a may be determined by the following equation:

$$\sigma_{max}=P_{max}/(2\pi rt \sin \theta),$$

where $P_{max}$=maximum force or load; r=radius of the circle circumscribed by the circular cross-section of the hemispherical striker as it is superimposed on the plane of the film; t=the undeformed film thickness; and sine $\theta$ is the sine of the angle between the plane of the sample holder and the fully deflected film sample at the moment of puncture.

The Total Energy "E" may be calculated by integrating the load displacement curve according to the following equation where E is the total energy; $v_0$ is the striker speed at the moment of impact with the film sample; P is the force; t is the time to puncture from impact; g is gravitational acceleration; and m is the mass of the crosshead including the striker.

$$E = v_0 \int_0^\tau P dt + g \int_0^\tau TP dt - \frac{1}{2m}\left[\int_0^\tau P dt\right]^2$$

The test is repeated for a total of four samples and a mean average is reported. Accordingly, from the ram puncture test one can determine the maximum force "P" in Newtons required to puncture the film and the total energy "E" in Joules which is absorbed by the film prior to failing. The time in msec to puncture the film also is recorded.

Sample 4 and Sample 5 represent embodiments of the invention and included the bag film having a patch film applied to one surface as noted above.

TABLE I

| Sample | | Avg Gauge mm | | Max Force to Puncture Newtons | Time to Puncture msec | Tot Energy to Puncture Joules |
|---|---|---|---|---|---|---|
| 1) | Bag Film | 0.0762 | | 112.3 | 11.27 | 1.199 |
| 2a) | Patch Film | 0.066 | | 108.4 | 11.06 | 1.125 |
| 2b) | Patch Film | 0.0825 | | 154.1 | 13.15 | 1.821 |
| 3) | Patch Film | 0.0763 | | 149.2 | 12.53 | 2.768 |
| 4a) | Bag w/2a 2.6 mil Patch | 0.182 | | 174.9 | 10.22 | 1.653 |
| 4b) | Bag w/2b 3.25 mil Patch | 0.203 | | 208.2 | 9.96 | 1.797 |
| 5) | Bag w/3 Patch | 0.1447 | | 212 | 11.06 | 2.305 |
| 6) | Control No.1 | bag film | 0.0686 | 70.2 | 8.63 | 0.518 |
|  |  | bag | 0.1854 | 223.0 | 8.66 | 1.797 |
| 7) | Control No. 2 | bag film | 0.762 | 112.3 | 11.27 | 1.199 |
|  |  | patch | 0.1788 | 461 | 9.19 | 0.629 |
|  |  | bag | 0.254 | 138.9 | 8.17 | 1.023 |

It should be noted that the patch of Sample 6, Control No. 1, could not be separately tested because it could not be removed from the base film. Puncture values of the bag film were made by testing an area of the bag not covered by the patch.

The patch film of Sample 2b is thicker than the patch film of Sample 2a, which accounts for the increase in the maximum force to puncture, total energy to puncture and the time to puncture.

The patch bags made with the patch films of Samples 2a and 2b are both superior to the commercial patch bag as represented by Control No. 2 (Sample 7). Patch bag Sample 4a, which has only a 2.6 mil (0.066 mm) patch, has acceptable puncture values. Patch bag Sample 4b using a 3.25 mil (0.0825 mm) patch is comparable to the commercial bag of Control No. 1 which has a thicker patch. While the patch bag Samples 4a and 4b were hand laminated using an adhesive, the patches can be adhered by corona discharge. Accordingly, a patch bag of Samples 4a and 4b wherein the patches are adhered solely by surface treatment to increase wetting tension, such as by corona discharge, are considered embodiments of the present invention.

The patch film of Sample 3 represents a preferred patch film embodiment of the present invention. Sample 3 demonstrates that eliminating the EVA component and using an ethylene-hexene copolymer as the mPlastomer component enhances the puncture resistance.

The patch bag of Sample 5, made with a 3 mil (0.076 mm) patch of the Sample 3 film, exhibited puncture resistance as good as, if not better than, the puncture resistance of the commercial bag of Control No. 1 (Sample 6) which has a much thicker patch (3 mils vs at least 4.5 mils). Also, the overall thickness of the Sample 5 bag of 0.1447 mm (5.7 mils) was almost 20% thinner than the overall thickness of the Control No. 1 bag which was 0.1854 mm (7.2 mils). As compared to Control No. 1 (Sample 6) which is an oriented three layer patch adhered to a four layer oriented film, the inventive patch bag of Sample 5 had a 28% improvement in total energy absorbed, took longer to puncture and was only slightly lower in the maximum force to puncture.

Abrasion resistance tests comparing the patch bag of the present invention with two commercial patch bags of the prior art as represented by the Control Samples 1 and 2 show that all of the patch bags tested have acceptable abrasion resistance and that abrasion resistance appear to be a function of the total thickness of the bag. Thus, Control No. 2 (Sample 7) being the thickest and having the thickest patch, will have the best abrasion resistance.

Tests of patch adherence also were conducted. These tests compared the patch adherence to the bag prior to heat shrinking the bag. Patch adherence prior to heat shrinking is important in that the better the adherence the more the bag can be manipulated and handled without portions of the patch separating from the bag or falling off altogether.

Adhesion is tested by determining the peel strength of the bond between the patch and bag. This is done using a TMI Release and Adhesion Tester, Model No. 80-14-00. For purposes of the test, four samples are cut from the patch bag in the transverse direction (TD) measuring 2.54 cm (1 in.) wide. For each test, about 7.6 to 10 cm (3 to 4 inches) of the patch film is manually peeled from the base film to create two tabs. One tab is fixed and the other bent back 135° and attached to a movable carriage of the tester. When the carriage is activated, it pulls at a rate of about 7.6 meters (300 in.) per minute. The instrument measures the patch adhesion at many points as the sample is pulled and reports the average force required to pull the sample.

The Control is from a patch bag similar to Control No. 2 which is a patch bag made according to U.S. Pat. No. 5,302,402 wherein the patch is a blown film. This was compered to a test piece from a patch bag according to Sample 5 of the present invention using an oriented monolayer patch including a process aid to minimize melt fracture. The results of tests run before heat shrinking are reported to Table II.

TABLE II

| Sample | Peel Strength (gm) |
|---|---|
| Control No. 2 | 41.6 |
| Sample 5 | 99.9 |

Table II shows that prior to heat shrinking the peel strength of the oriented patch according to the present invention is substantially greater than for the unoriented patch. This is surprising because the patch used for Sample 5 contained a processing aid to reduce the melt fracture of the film. No results of the peel test after heat shrinking are given. This is because after heat shrinking, the bond strength in both cases increased to the point where the patch did not peel from the base film and instead the film failed. Thus the peel strength of both films after heat shrinking was stronger than the film itself.

Thus, it should be appreciated that the present invention accomplishes its intended objects. In one embodiment, the monolayer, oriented patch composed of a blend of mVLDPE, Plastomer and VLDPE with EVA permits a significant reduction in patch thickness over the prior art while providing the patch bag with enhanced puncture resistance properties. Preferred blends for the patch film comprising blends of mVLDPE, Plastomer and VLDPE, and especially blends employing mPlastomers that are ethylene-hexene copolymers in the blend of these materials also will provide enhanced puncture resistance in a relatively thin monolayer structure. The patch film together with the bag film structure provides an improved patch bag of the present invention that has superior puncture resistance than prior art patch bags. Moreover, the superior puncture resistance is accomplished without increasing the thickness of the bag film and while significantly decreasing the patch thickness. Improved puncture resistance further is obtained without compromising the abrasion resistance. It also is significant that the adherence of the patch film to the bag is accomplished by the corona treatment of these films to impart a wetting tension of above 38 dynes/cm even though both films are oriented.

Having described the invention in detail, what is claimed as new is:

1. A patch bag comprising:
   a) an oriented heat shrinkable multilayer bag film having a heat seal layer and an exterior surface; and
   b) an oriented monolayer heat shrinkable patch adhered to said exterior surface, said patch comprising:
      i) 20 to 60 wt. % of a metallocene catalyzed first polymer which is a copolymer of ethylene and hexene having a density below 0.900 gm/cc, a melt index of less than 1 dg/min. and a melting temperature below 90° C.;
      ii) 20 to 60 wt. % of a metallocene catalyzed second polymer which is a copolymer of ethylene and octene having a density of 0.900 to 0.905 gm/cc, a melt index of about 1 dg/min. and a melting point of about 100° C.; and
      iii) 15 to 25 wt. % of a third polymer which is a copolymer of ethylene and octene having a density greater than the density of said second polymer and less than about 0.915 gm/cc, a melt index of about 1 dg/min. and a melting point of 115 to 130° C.

2. A heat shrinkable patch-bag combination as in claim 1 wherein said bag exterior surface adhered to said patch exterior surface both have a high surface energy of at least 38 dynes/cm wetting tension as the sole means for adhering said patch to said bag.

3. A heat-shrinkable patch-bag combination as in claim 1 having a ram puncture force of at least 200 Newtons and energy to puncture of at least 2 Joules.

4. A heat-shrinkable patch-bag combination as in claim 2 wherein the peel strength between a 25.4 mm (1 in.) strip of the patch film and the bag film is greater than 50 gms.

* * * * *